United States Patent [19]

Shea

[11] 3,988,989

[45] Nov. 2, 1976

[54] HIGH-PRESSURE, ELECTRICALLY INITIATED EXPLOSIVE IGNITER

[75] Inventor: John W. Shea, King George, Va.

[73] Assignee: The United States of America as represented by the Secretary of the Navy, Washington, D.C.

[22] Filed: Sept. 10, 1975

[21] Appl. No.: 611,953

[52] U.S. Cl. ............................................. 102/28 R
[51] Int. Cl.² ......................................... C06C 3/00
[58] Field of Search .................. 102/28, 46, 70.2 R; 60/39.82 E, 39.82 P, 256; 89/1 B

[56] References Cited
UNITED STATES PATENTS

| 2,755,735 | 7/1956 | Harter | 102/28 |
| 3,393,605 | 7/1968 | Parnell | 89/1 B |
| 3,703,121 | 11/1972 | Gawlick et al. | 89/1 B |

Primary Examiner—Samuel Feinberg
Attorney, Agent, or Firm—R. Sciascia; R. Beers; S. Sheinbein

[57] ABSTRACT

An electrical explosive igniter, or initiator, of the cylindrical type having electrical leads coming through to a bridge wire in an ignition mix container. An anvil cutter of cylindrical shape is force-fitted into the center of the igniter and a movable piston is spaced therefrom. The piston has a tapered internal boring. When the piston is forced sharply backward by the internal pressures of the ignited explosives, it shears the wires against the anvil cutter and the tapered portion forms a tight metal-to-metal seal between the anvil cutter and the igniter wall. The greater the pressure, the better the seal becomes.

7 Claims, 4 Drawing Figures

HIGH-PRESSURE, ELECTRICALLY INITIATED EXPLOSIVE IGNITER

BACKGROUND OF THE INVENTION

This invention relates to improvements in electrical explosive initiators and especially to an electrical explosive initiator with improved high-pressure capability.

In the testing and evaluation of explosives and rocket propellants, it is desirable to obtain data dealing with burning rate and burning characteristics. Presently available means of obtaining such data are limited to a maximum pressure of about 40–50 thousand pounds per square inch gage (psig) because the electrical explosive initiators (or igniters) are limited to this maximum pressure.

The pressure limitation of present initiators is based on the means of sealing the electrical lead penetrations of the initiators. There are many conventional methods of sealing the electrical leads, the most common being the ceramic seal, such as used in the Mark 17, Mod 0, igniter. This method offers a peak capability of about 50,000 psig. As the pressure increases towards the maximum the reliability of the igniter decreases. The ceramic seal method of sealing the electrical leads probably offers the maximum pressure confinement available at this time in electrically initiated igniters.

SUMMARY OF THE INVENTION

The objects and advantages of this invention are obtained by enclosing a movable piston and an anvil cutter in an electrical explosive initiator. The pressure buildup in the booster or ignited explosive forces the piston back against the anvil, cutting the electrical lead wires and sealing their entrance openings by a metal-to-metal seal between the anvil and a tapered internal bore of the piston.

An object of this invention is to improve the pressure confinement capability of electrical explosive initiators.

A further object is to increase the reliability of electrical explosive initiators at high pressures.

Other objects, advantages and novel features of the present invention will become apparent from the following detailed description of the invention when considered in conjunction with the accompanying drawing.

DETAILED DESCRIPTION OF THE INVENTION

Figure 1:
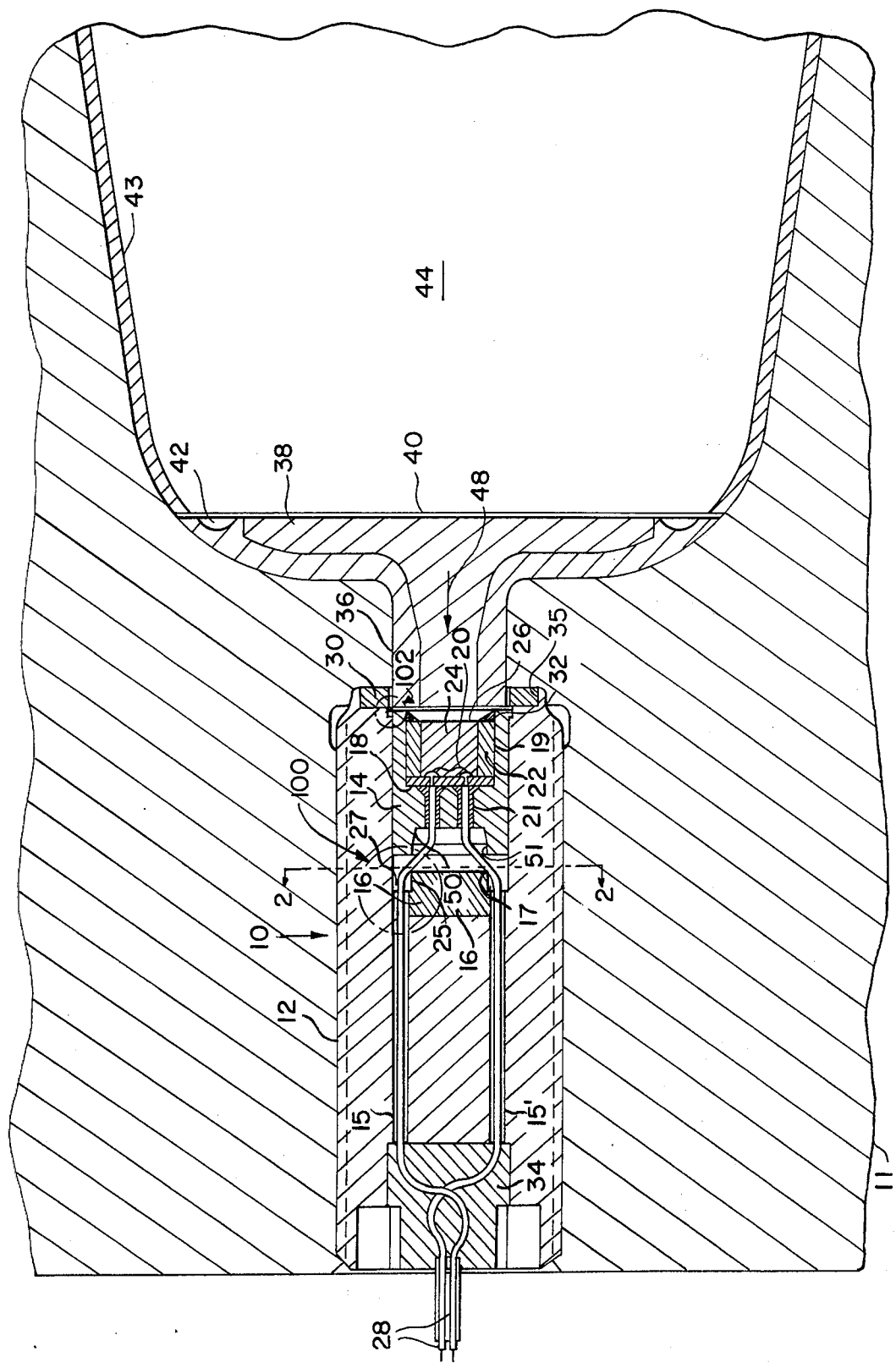
FIG. 1 is a cross-sectional view of an embodiment of the invention in conjunction with a booster explosive head and a main-charge container.
Figure 3:
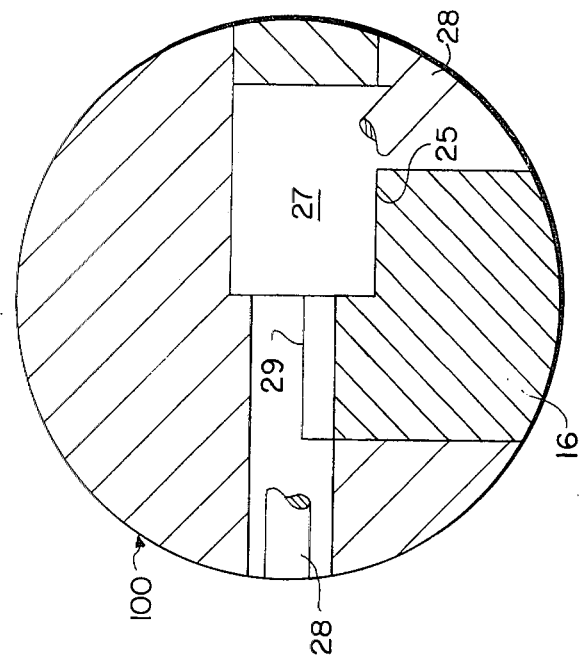
FIG. 3 is an enlarged view of the portion of FIG. 1 within the circle numbered 100, the wire 28 being broken away for clarity.
Figure 4:
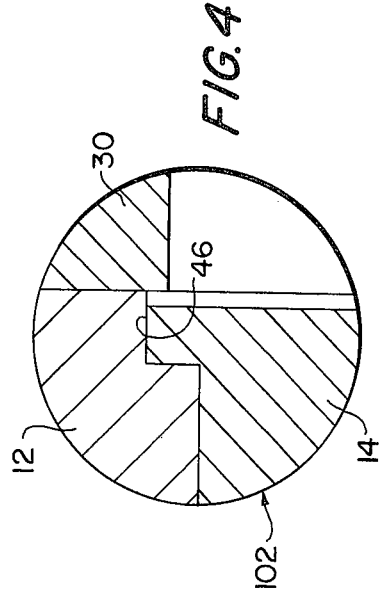
FIG. 4 is an enlarged view of the portion of FIG. 1 within the circle numbered 102.
Figure 2:
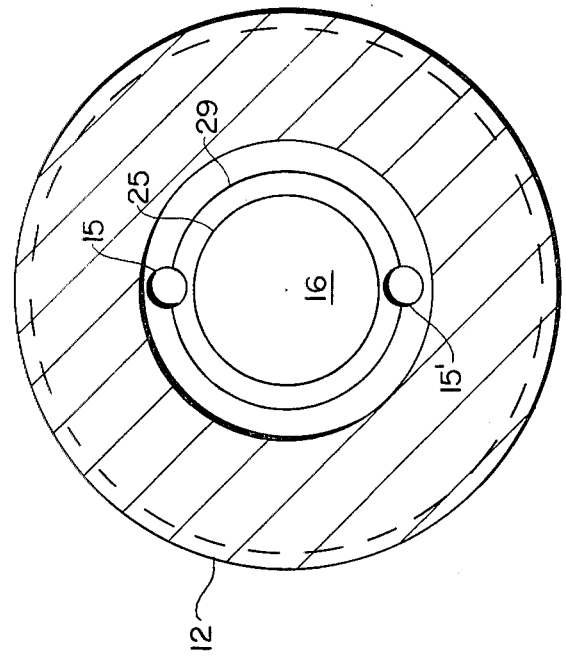
FIG. 2 is a cross-section of FIG. 1 taken along the line 2—2.

In FIG. 1, an embodiment of an improved high-pressure, electrical explosive initiator 10 is shown in conjunction with a booster-explosive head 36 and container 43 for a main explosive charge 44, all contained within a container 11 which is shown only partially. The initiator 10 is sealed to the container 11 by means of a high-pressure seal 30 which may, for example, be a copper washer pressed into the boring 35 of the initiator body 12. The booster-explosive head 36, which may be made of aluminum, for example, is bonded to a closure disc 40. The booster-explosive head 36 and closure disc 40 may be part of the container 43 for the main charge 44. The bonding agent 42 may be an epoxy resin, for example. The central area of the booster head 36 contains a material such as thermite, for example, for igniting the main charge. Such a material may, or may not, be necessary.

The electrical explosive initiator 10 has a cylindrical body, or housing, 12. The body 12 is sealed at the left by the rear environmental seal 34 through which the electrical ignition leads 28 are brought in. The seal is placed in a boring in the body 12 and may, for example, be made from an epoxy resin which will bind to a metal. The body 12 may be made from a hardened steel, for example.

The following description should be read in relation to all the figures.

The leads 28 are brought forward through a pair of holes 15, 15' in the initiator body and around a circular anvil cutter 16 close to, or touching the front corner 17 of the cutter. Spaced forwardly of the cutter 16 and forming a sliding fit with the inner diameter of the initiator body 12 is a cylindrical piston 14. At its rear end, the piston 14 has an internal boring comprising a cylindrical rear portion 51 and a tapered front portion 50. The inner diameter of the rear portion 51 is slightly greater than the outer diameter of the front part of the anvil cutter 16. The front portion of the piston boring tapers inwardly from a maximum diameter which is the same as that of the rear cylindrical portion 51. The anvil cutter 16 and the piston 14 may, for example, be made of hardened and mild steel, respectively.

It may be noted that the anvil cutter has a cylindrical front section 25 which has a smaller diameter than its rear section 29, the rear section 29 being pressed into a boring in the body of the initiator by a force fit. The anvil cutter is made as a separate piece because boring out the area 27 (into which the rear end of the piston will fit, as explained later) is difficult to do. Theoretically, the anvil cutter could be simply an integral part of the initiator body. The holes 15 and 15' are drilled after pressing the anvil cutter 16 in the initiator body 12.

The front part of the piston 14 has another central cylindrical boring 19 in which there is a container 22 for an explosive ignition mix 24. The container 22 is tubular and may be made of nylon or polyethylene, for example. The disc 18 is a low-pressure end seal made of an electrical insulating material, such as a ceramic, which has to be capable of holding up to a pressure a little above what the piston lip 46 will shear at.

The electrical leads 28 are brought into the mix container through insulator collars 21 which may be of epoxy resin, for example. The wires are brought through holes in the low-pressure seal 18 and connected to a bridge wire 20.

The forward end of the ignition mix container is sealed by a closure disc 26 which has an epoxy bead 32 around its periphery, the bead comprising a front environmental seal of the initiator. The disc may also be secured by a crimping or staking process.

The front end of the piston 14 has a lip, or flange, 46 encircling it. This lip 46 abuts a shoulder on the inner diameter of the initiator body 12 and locks the piston in place.

The front boring in the initiator body consists of three parts. From front to rear, and in order of decreasing diameter, these parts are:

a. the part which receives the piston lip 46;
b. the part which receives the remainder of the piston; and
c. the part which receives the rear section of the anvil cutter.

In operation, a current through the electrical leads 28 heats the bridge wire 20 which ignites the explosive ignition mix 24. Ignition is transferred to the secondary booster explosive 38 and then to the main charge 44. The low-pressure seal 18 resists pressure leakage until the internal vessel pressure 48 reaches a predetermined amount which causes the piston lip 46 to shear. Shearing of the lip 46 allows the piston 14, under considerable acceleration, to move to the rear. The rearward movement of the piston cuts the electrical leads on the sharp circular corner of the anvil cutter 16. The interference fit between the cutter and the boring in the piston causes the piston to begin to expand. The tapered portion of the piston aids the piston expansion causing a compressive metal-to-metal seal between the piston, anvil cutter and initiator body. Increasing internal vessel pressure increases the compressive forces aiding the seal.

Obviously, many modifications and variations of the present invention are possible in light of the above teachings. It is therefore to be understood that, within the scope of the appended claims, the invention may be practiced otherwise than as specifically described.

What is claimed is:

1. In an electrical explosive initiator having a cylindrical body, a rear seal, electrical ignition leads coming into said body through said rear seal, a container for an explosive ignition mix located within said body at the front end and a bridge wire within said container, said electrical ignition wires being connected to said bridge wire, the improvement comprising:

cylindrical cutting means having a front corner and being located within said initiator body, said electrical leads running through the body into a space between the cutting means and the body; and cylindrical piston means located within and abutting said initiator body in front of and spaced from said cutting means, said piston means being formed with a central front boring, a central rear boring, and a peripheral lip which engages said piston, said ignition mix container being located in said front boring and said electrical leads running through said rear boring and said piston means to said ignition mix container, said rear boring being formed with a cylindrical rear portion and a tapered front portion, the inner diameter of the rear portion being slightly larger than the outer diameter of the corner section of said cutting means, whereby, when the piston means is moved to the rear, the electrical leads are sheared off between the edge of said rear boring and the corner of said cutting means, and the rear of the piston is driven into the space between the cutting means and the initiator body and the tapered portion is driven against said corner to form a tight seal between the corner, the piston means and the initiator body.

2. An initiator as in claim 1, wherein said piston means, said initiator body and said circular means are made of metal, and the seal formed between them is a metal-to-metal seal.

3. An initiator as in claim 1, wherein said initiator body is formed with a boring at its front end which is somewhat greater in diameter than the inner diameter of the body, said lip of said piston fitting into this front end boring of the body, said lip being sheared off by the corner formed by this front end boring if the piston means is moved to the rear by a sufficient force.

4. An initiator as in claim 1, wherein said circular means is shaped like a pair of cylinders of different diameters abutting each other with a common axis, the cylinder with the smaller diameter being in front of the other.

5. An initiator as in claim 1, further including an annular sealing means, the initiator body having an outstanding ring-shaped member at its front end, the sealing means being retained in the ring-shaped member for pressure-sealing any cylindrical object of the proper size which is placed within the sealing means.

6. An initiator as in claim 1, wherein the initiator body is formed with a front boring of three sections,
the front section having the greatest diameter and receiving the lip of the piston means,
the middle section receiving the rest of the piston means, and
the rear section having the smallest diameter and receiving the cutting means.

7. An initiator as in claim 4, wherein the initiator body is formed with a front boring of three sections,
the front section having the greatest diameter and receiving the lip of the piston means,
the middle section receiving the rest of the piston means, and
the rear section having the smallest diameter and receiving the section of the cutting means with the greater diameter.

* * * * *